United States Patent [19]

O'Saben

[11] Patent Number: 4,844,529
[45] Date of Patent: Jul. 4, 1989

[54] WIND DEFLECTOR

[76] Inventor: Stephen V. O'Saben, 30402 Thomas St., Willowick, Ohio 44094

[21] Appl. No.: 144,953

[22] Filed: Jan. 19, 1988

[51] Int. Cl.$^4$ ............................................. B60J 1/20
[52] U.S. Cl. ..................... 296/91; 248/487; 98/2.12
[58] Field of Search ................ 296/91, 1 S; 98/2.12, 98/2.19; 248/476, 487, 479, 477, 478

[56] References Cited

U.S. PATENT DOCUMENTS

| | | | |
|---|---|---|---|
| 3,667,369 | 6/1972 | Smith | 98/2.12 |
| 4,134,612 | 1/1979 | Nelson | 98/2.12 |
| 4,196,930 | 4/1980 | Busche | 296/91 |

*Primary Examiner*—Robert R. Song
*Attorney, Agent, or Firm*—Renner, Otto, Boisselle & Sklar

[57] ABSTRACT

A wind deflector for use at the forward exterior of the side windows of a tractor or truck for diverting air currents away from the window and enabling the driver or passenger to travel in comfort with the window open comprises a transparent vertically elongated thick sheet or panel of plastic with the top and bottom ends bent in the same direction to form end flanges. A threaded stud extends outwardly through a reinforcing metal plate and the bent end flanges. Adjustably clamped along the projecting threaded stud is a clamp arm bracket, the outer end of which is provided with a tubular clamp which is adapted to encircle and clamp on a rear view mirror bracket arm or strut. The encircling portion of the bracket clamp is generally tangent to the clamp arm bracket. The bracket clamp may be adjusted radially along the stud, or inverted in order properly to engage the mirror arm or strut. Where the lower mirror arm or strut is inclined, the lower clamp arm bracket may be twisted properly to engage either the fore or aft inclined strut or mirror bracket arm. Alternatively, the lower end of each plastic sheet may be bent at an angle, with the attached clamp arm bracket remaining untwisted. The right and left hand side deflectors in such case may be a mirror image of each other. The deflectors may readily be adjusted to direct air flow away from the open window and across the reflective face of the rear view mirror, thus assisting in maintaining the mirror clean while also reducing drag. More importantly, the driver or passenger may travel in comfort with the window open.

16 Claims, 2 Drawing Sheets

WIND DEFLECTOR

DISCLOSURE

This invention relates generally as indicated to a wind deflector and more particularly to a wind deflector of trucks or highway tractors enabling the driver or passenger to travel in comfort with the window open.

BACKGROUND OF THE INVENTION

Although many highway tractors or trucks are now air conditioned, some drivers nonetheless prefer driving with their windows open both for comfort and better lateral visibility. However, with a window open, the driver is usually struck with a blast of air which is in part caused by the large rear view mirrors at each side of the tractor or truck. Even if the driver could suffer the continuous blast of air, rain or inclement weather makes it impossible to keep the window open, even though during such weather, both comfort and visibility might normally dictate that the windows be open.

Also, during such weather, rear view mirrors tend to collect rain or dirt, requiring that they frequently be wiped or cleaned. This is in part due to air current cavitation adjacent the mirror surface. Unless a driver stops, the only way this can be done is through an open window. Further, open windows in vehicles such as automobiles or trucks tend to create drag and impair fuel efficiency.

It would therefore be desirable to have a wind deflector adjacent the side windows of a tractor or truck which would enable the driver and passenger or both to travel in comfort with the windows open, even in rain or wet conditions. It would also be desirable if such wind deflectors would assist in maintaining the rear view mirrors clear and also reduce the amount of drag caused by the window being open. It would also be beneficial that the angle of the deflector be readily adjustable to obtain the benefits noted since the angle of the rear view mirror is also adjustable as is the driver's seat. It would further be important that such deflectors be readily mounted on existing trucks or tractors, be inexpensive, and easy to install and adjust.

The latter mounting factor however creates a problem. A convenient place to mount such deflectors is from the struts of the rear view mirror brackets. Unfortunately, such brackets are not all the same. Those on trucks made by the Ford Motor Company (FORD) utilize angled and inclined struts supporting the lower mirror bracket arm, while those made by WHITE-VOLVO, use generally horizontal arms. Moreover, the vertical spacing may vary. It is therefore beneficial if the wind deflector using the same or similar parts can be readily mounted on mirror bracket arms, both right and left hand of different configurations.

SUMMARY OF THE INVENTION

A wind deflector for use at the forward exterior of the side windows of a tractor or truck for diverting air currents away from the window and enabling the driver or passenger to travel in comfort with the window open comprises a transparent vertically elongated thick sheet or panel of plastic with the top and bottom ends bent in the same direction to form end flanges. A threaded stud extends outwardly through a reinforcing metal plate and the bent end flanges. Adjustably clamped along the projecting threaded stud is a clamp arm bracket, the outer end of which is provided with a tubular clamp which is adapted to encircle and clamp on a rear view mirror bracket arm or strut. The encircling portion of the bracket clamp is generally tangent to the clamp arm bracket. The bracket clamp may be adjusted radially along the stud, or inverted in order properly to engage the mirror arm or strut. Where the lower mirror arm or strut is inclined, the lower clamp arm bracket may be twisted properly to engage either the fore or aft inclined strut or mirror bracket arm. Alternatively, the lower end of each plastic sheet may be bent at an angle, with the attached clamp arm bracket remaining untwisted. The right and left hand side deflectors in such case may be a mirror image of each other. The deflectors may readily be adjusted to direct air flow away from the open window and across the reflective face of the rear view mirror, thus assisting in maintaining the mirror clean while also reducing drag. More importantly, the driver or passenger may travel in comfort with the window open.

To the accomplishment of the foregoing and related ends the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
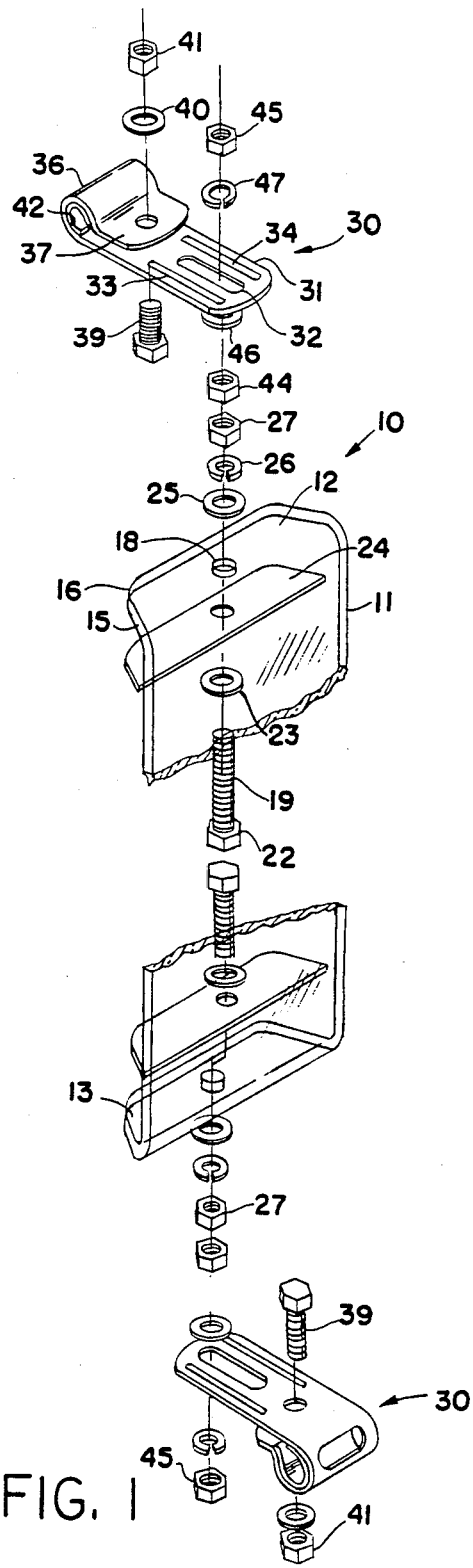
FIG. 1 is an exploded perspective view of a wind deflector in accordance with the present invention.

Referring first to FIG. 1 there is illustrated a wind deflector shown generally at 10 in accordance with the present invention. The wind deflector comprises a vertically elongated transparent fairly thick rigid sheet 11 which has top and bottom horizontal flanges 12 and 13, both of which extent away from the viewer as seen in FIG. 1. Preferably, the panel is formed of a thick sheet of transprent clear plastic material such as a cast acrylic sheet sold under the trademark LUCITE by DuPont. The flanges may be formed by heating and forming the ends of the plastic sheet in the area of the bend and preferably the edges of each flange are beveled as indicated at 15 with the corners rounded as seen at 16.

Each flange is provided with a central vertical hole indicated at 18 through which projects a threaded stud 19. The threaded studs illustrated and the parts assembled thereto are the same for the top and bottom flanges and accordingly only the details of the threaded stud and assembled parts at the top of the wind deflector 10 will be described in detail.

The threaded stud 19 is provided with a hexagonal head 22. The stud extends upwardly through a washer 23 and a reinforcing plate 24 both of which are on the underside of the top flange 12. The reinforcing plate has substantially the same surface outline as the interior of the flange and acts to protect the flange and to distribute the clamping load thereon. On the outside of the flange there is provided a washer 25, a lock washer 26 and a nut 27. When the nut 27 and associated lock washer 26 are tightened on the threaded stud 19 the threaded stud is clamped and locked to the flange 12 with the major extent of the threaded stud projecting upwardly from the flange. While the stud through the top flange projects upwardly, it will of course be appreciated that the stud through the bottom flange projects downwardly.

Secured to the upwardly projecting stud 19 is a clamp arm bracket shown generally at 30. The bracket 30 is generally conventional and is used for hanging or supporting tubing. The bracket is stainless steel and includes a generally planar arm 31 which is provided with a center slot 32 having stiffening ridges 33 and 34 on either side. The stud is of course adapted to extend through the slot 32 at any point therealong. The bracket 30 includes an encircling portion 36 on its outer end which terminates in a flange or tab 37 which is parallel to but spaced from the art. Holes in the arm and tab as indicated at 38 accommodate bolt 39 on which fit washer 40 and nut 41. By tightening the nut and bolt assembly, the encircling portion 36 may be constricted to clamp to a rod or tube. The interior of the encircling portion is provided with a somewhat soft plastic lining 42 to facilitate the grip on a tube or rod.

The one end 31 of the arm of the clamp bracket 30 is secured to the stud 19 by nuts 44 and 45 on each side of the arm and interposed washers 46 and 47, the latter being a lock washer. In this manner the clamp bracket 30 may be adjusted axially along the stud and locked in the selected axial position. The clamp bracket may also be adjusted to extend from the stud in any azimuth or direction and the radial extent of the encircling portion 36 may be adjusted by positioning the stud along the length of the slot 32.

In comparing the clamp arm bracket 30 at the top of FIG. 1 with the clamp arm bracket at a bottom it will be noted that the arm brackets extend in opposite directions. Thus the arm bracket at the top may extend to the rear or aft while the arm bracket at the bottom extends forwardly. The wind deflector of FIG. 1 is designed to clamp to generally horizontal rear view mirror bracket struts such as seen and hereinafter described in connection with FIGS. 4 and 5. Once the clamp arm brackets 30 are secured to the tubular or rod mirror bracket struts by the tightening of the clamp bolts 39 and nuts 41, the nuts 44 and 45 may be tightened to lock the clamp arm brackets to the respective top and bottom threaded studs 19. Then, in order to adjust the angle of the wind deflector, the nuts 27 may be loosened to pivot the sheet or panel 11 about the axis of the aligned studs 19. Once the desired angular adjustment is obtained the nuts 27 are tightened.

In addition to the vertical adjustment of the clamp arm brackets along the threaded studs, it will be noted that a further vertical adjustment may be obtained simply by inverting either clamp arm bracket 30. Since the encircling portion is tangent to the major extent of the arm, inversion of the clamp arm bracket will move the axis of the encircling portion vertically substantially a full diameter of the encircling portion.

Figure 6:
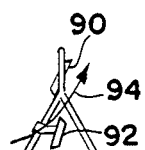
FIG. 6 is a fragmentary perspective view of a wind deflector such as seen in FIG. 2 mounted on another type of rear view mirror bracket struts.

As indicated, the embodiment of FIG. 1 is designed to secure to generally horizontally extending rear view mirror bracket struts. Another major type of rear view mirror bracket assembly utilizes bottom struts which extend angularly downwardly or inclined with respect to horizontal. Such assembly is seen in FIG. 6. In order to accommodate the bottom inclined strut, the forms of the invention seen in FIGS. 2 and 3 may be employed.

Figure 2:
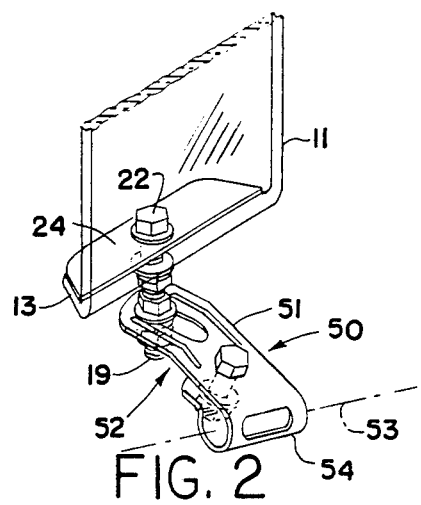
FIG. 2 is a perspective view of the lower end of another embodiment of the present invention.

Referring first to FIG. 2 it will be seen that the bottom clamp arm bracket 50 has its planar arm 51 twisted as indicated at 52 so that the axis 53 of the encircling portion 54 is inclined with respect to the axis of the threaded stud 19 and thus the vertical extent of the sheet or panel 11. It should be kept in mind that the flange 13 is horizontal while the edges of the panel or sheet as well as the axis of the stud is vertical.

Figure 3:
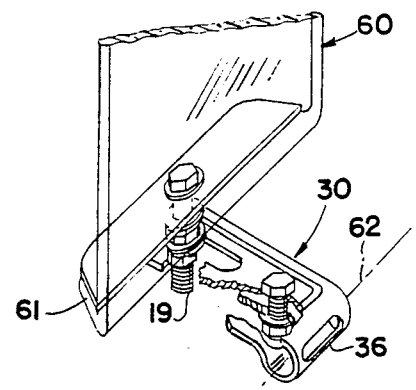
FIG. 3 is a perspective view of the lower end of yet another embodiment of the present invention.

With reference to FIG. 3 there is illustrated a panel 60 which extends vertically and the upper portion thereof may be identical to that shown in the upper portion of FIG. 1. However, the lower portion includes a flange 61 which is not horizontal but rather inclined. Thus the axis of the stud 19, which is normal to the flange, is inclined with respect to the vertical extent of the panel or sheet, and the axis 62 of the encircling portion 36 of the clamp arm bracket 30 is also inclined and generally parallel to the flange 61. In any event by forming the flange 61 at an inclined angle, the axis 62 is also similarly inclined.

Figure 4:
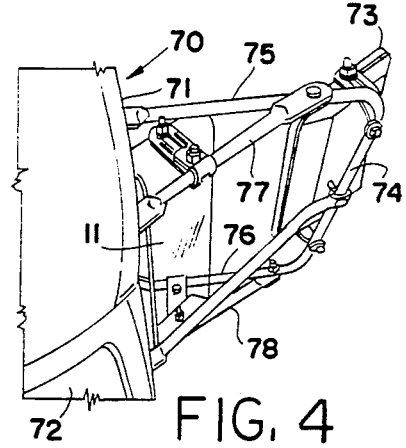
FIG. 4 is a fragmentary perspective view of a wind deflector in accordance with the present invention mounted on one type of rear view mirror bracket struts.
Figure 5:
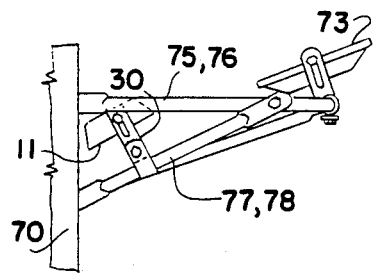
FIG. 5 is a top plan view of the assembly of FIG. 4.

Referring now to FIGS. 4 and 5 there is illustrated fragmentarily a truck or tractor cab 70 which includes a side window 71 and a windshield 72. The rear view mirror indicated at 73 is mounted on bracket 74 which includes horizontally extending struts 75 and 76 as well as angularly related struts 77 and 78. The wind deflector panel 11 such as shown in FIG. 1 is mounted vertically between the upper horizontal strut 77 and the lower horizontal strut 76. As indicated more clearly in FIG. 4 the upper clamp arm bracket extends forwardly to engage the strut 77 while the lower clamp arm bracket is inverted and extends rearwardly to engage the strut 76. The angle of the wind deflector panel may be adjusted to deflect wind away from the window 71 and across the reflective face of the rear view mirror 73. The rear view mirror bracket arm assembly seen in FIGS. 4 and 5 may be of the type used on WHITE-VOLVO brand trucks and tractors.

In FIGS. 6–9 there is illustrated another type of rear view mirror bracket arm assembly such as that employed on FORD trucks and tractors. Referring first to FIG. 6 the rear view mirror 80 is mounted between the horizontal arms of a relatively smaller U-shaped bracket 82 which is supported at the top by triangularly disposed horizontal bracket arm struts 83 and 84 and at the bottom by downwardly inclined lower struts 85 and 86. A diagonal brace 87 is provided as indicated. In any event because the struts 85 and 86 are downwardly inclined from the connection 88 to the cab 89, while the struts 83 and 84 are horizontal, the embodiments of the invention seen in FIG. 2 or 3 must be employed. In FIG. 6 the transparent panel 11 is supported at its top by bracket arm assembly 30 such as seen in FIG. 1 secured to the strut 83. The lower clamp arm bracket 50 is twisted as indicated in FIG. 2 and is secured to the strut 85.

Figure 7:
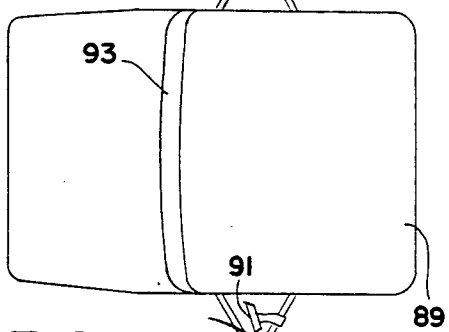
FIG. 7 is a top plan view on a reduced scale of the truck cab illustrating the air currents produced by the wind deflectors vis-a-vis the rear view mirrors.

FIG. 7 illustrates a top plan view of the truck or tractor with rear view mirrors 80 and 90 being mounted on the driver's and passenger's side respectively and a wind deflector positioned as indicated at 91 on the driver's side and as indicated at 92 on the passenger's side. The wind deflectors are positioned to cause the air moving from the windshield 93 around the cab 89 to pass in the direction of the arrows 94 and 95 moving away from the side windows of the cap and across the reflective face of the rear view mirrors 80 and 90. This assists in maintaining the reflective face clean, particularly in inclement weather. Such wind deflection also of course deflects the wind away from the side windows.

Figure 9:
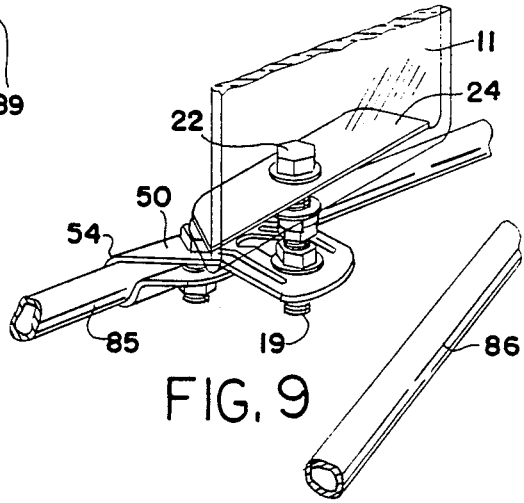
FIG. 9 is a view of the same wind deflector mounted on the driver's side.
Figure 8:
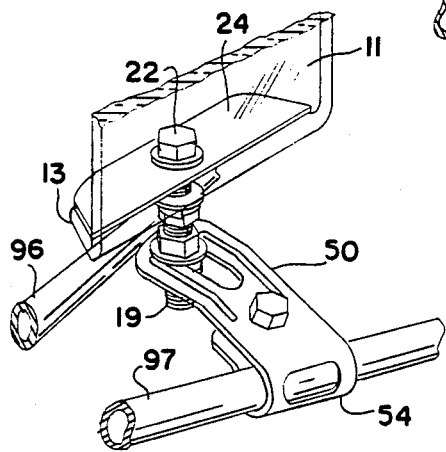
FIG. 8 is an an enlarged broken perspective of the wind deflector of the type seen in FIG. 2 mounted on the passenger side of rear view mirror bracket struts as shown in FIG. 6.

FIGS. 8 and 9 illustrate respectively the bottom clamp arm bracket mounted on the FORD passenger side and the FORD driver's side. On the passenger side as seen in FIG. 8 the struts 96 and 97 extend downwardly and to the right while the struts 85 and 86 seen in FIG. 9 extend downwardly to the left. Thus with the twisted clamp arm bracket of FIG. 2 the same bracket may be employed to secure the wind deflector either to the passenger or driver's side simply by rotating the clamp arm bracket approximately 180° about the stud 19. However, if the embodiment of FIG. 3 is employed with the inclined rear view mirror arm struts, then a right hand and left hand form of the wind deflector must be employed.

In any event it is believed now apparent that there is provided a low cost readily attachable wind deflector for use with truck or tractor cabs which will enable the driver to travel with the window open while at the same time assisting in maintaining the reflective surface of the rear view mirror clean and reducing drag.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A wind deflector adapted to be mounted on the bracket arm struts of a truck rear view mirror comprising a vertically elongated panel of transparent material, a flange at each vertical end, a threaded stud extending through each flange, and a clamp arm bracket mounted on each threaded stud, said clamp arm bracket including an arm, one end of which is secured to said threaded stud, the other end including an encircling portion adapted to be clamped on to the bracket arm struts of a truck rear view mirror, said distal encircling portion being circular and substantially tangent to said clamp bracket arm.

2. A wind deflector as set forth in claim 1 wherein said encircling portion includes a deformable inner surface to grip such bracket arm struts of a rear view mirror.

3. A wind deflector adapted to be mounted on the bracket arm struts of a truck rear view mirror comprising a vertically elongated panel of transparent material, a flange at each vertical end, a threaded stud extending through each flange, and a clamp arm bracket mounted on each threaded stud, said panel being a thick sheet of transparent plastic bent at its vertical ends to form said flanges, each said threaded stud including a head, and a nut and lock washer on said threaded stud on one side of said respective flange cooperating with said head and a washer on the opposite side of said flange to secure said threaded stud to said flange.

4. A wind deflector as set forth in claim 3 including a reinforcing plate between said head and flange to protect said flange and distribute the clamping load thereon.

5. A wind deflector adapted to be mounted on the bracket arm struts of a truck rear view mirror comprising a vertically elongated panel of transparent material, a flange at each vertical end, a threaded stud extending through each flange, and a clamp arm bracket mounted on each threaded stud, said clamp arm bracket including an arm, one end of which is secured to said threaded stud, the other end including an encircling portion adapted to be clamped on to the bracket arm struts of a truck rear view mirror, nuts and washers on said threaded stud on each side of said one end of said clamp arm bracket, at least one of said washers being a lock washer, whereby said clamp arm bracket can be adjustably secured along said threaded stud.

6. A wind deflector as set forth in claim 5 including an elongated slot in the arm of the clamp arm bracket through which said stud extends whereby the clamp arm bracket may be secured to said stud to adjust both the azimuth and radial extent of the encircling portion.

7. A wind deflector adapted to be mounted on the bracket arm struts of a truck rear view mirror comprising a vertically elongated panel of transparent material, a flange at each vertical end, a threaded stud extending through each flange, and a clamp arm bracket mounted on each threaded stud, said clamp arm bracket including an arm, one end of which is secured to said threaded stud, the other end including an encircling portion adapted to be clamped on to the bracket arm struts of a truck rear view mirror, the arm of the clamp arm bracket at the bottom end of said panel being twisted so that the axis of the encircling portion is inclined to grip a rear view mirror bracket arm strut similarly inclined.

8. A wind deflector adapted to be mounted on the bracket arm struts of a truck rear view mirror comprising a vertically elongated panel of transparent material, a flange at each vertical end, a threaded stud extending through each flange, and a clamp arm bracket mounted on each threaded stud, said clamp arm bracket including an arm, one end of which is secured to said threaded stud, the other end including an encircling portion adapted to be clamped on to the bracket arm struts of a truck rear view mirror, the bottom flange of said panel being inclined so that the axis of the encircling portion of the clamp arm bracket secured thereto is inclined to grip a rear view mirror bracket arm strut similarly inclined.

9. In combination a truck cab having side windows and a rear view mirror supported from top and bottom bracket arm struts, and a wind deflector mounted on said struts to deflect wind away from the side window and across the reflective face of the rear view mirror, said wind deflector comprising a vertically elongated panel of transparent material, a flange at each vertical end thereof, a threaded stud extending through each bent flange, and a clamp arm bracket mounted on each threaded stud for securing said deflector to said struts, said clamp arm brackets including an arm, one end of which is secured to said stud, the other end including an encircling portion adapted to be clamped on said rear view mirror bracket arms struts, said distal encircling portion being circular and substantially tangent to said clamp bracket arm.

10. The combination set forth in claim 9 wherein said encircling portion includes a deformable inner surface to grip said rear view mirror bracket arm struts.

11. In combination a truck cab having side windows and a rear view mirror supported from top and bottom bracket arm struts, and a wind deflector mounted on said struts to deflect wind away from the side window and across the reflective face of the rear view mirror, said wind deflector comprising a vertically elongated panel of transparent material, a flange at each vertical end thereof, a threaded stud extending through each bent flange, and a clamp arm bracket mounted on each threaded stud for securing said deflector to said struts, said panel being a thick sheet of transparent plastic bent at its vertical ends to form said flanges, each said threaded stud including a head, and a nut and lock washer on said threaded stud on one side of the respective flange cooperating with said head and washer on the opposite side of said flange to secure said stud to the flange.

12. In combination a truck cab having side windows and a rear view mirror supported from top and bottom bracket arm struts, and a wind deflector mounted on said struts to deflect wind away from the side window and across the reflective face of the rear view mirror, said wind deflector comprising a vertically elongated panel of transparent material, a flange at each vertical end thereof, a threaded stud extending through each bent flange, and a clamp arm bracket mounted on each threaded stud for securing said deflector to said struts, said clamp arm brackets including an arm, one end of which is secured to said stud, the other end including an encircling portion adapted to be clamped on said rear view mirror bracket arm struts, nuts and washers on said threaded stud on each side of said one end of said clamp arm bracket, at least one of said washers being a lock washer, thereby said clamp bracket can adjustably be secured along said threaded stud.

13. The combination set forth in claim 12 including an elongated slot in the arm of the clamp arm bracket through which said stud extends whereby the clamp arm bracket may be secured to said stud to adjust both the azimuth and radial extent of the encircling portion.

14. In combination a truck cab having side windows and a rear view mirror supported from top and bottom bracket arm struts, and a wind deflector mounted on said struts to deflect wind away from the side window and across the reflective face of the rear view mirror, said wind deflector comprising a vertically elongated panel of transparent material, a flange at each vertical end thereof, a threaded stud extending through each bent flange, and a clamp arm bracket mounted on each threaded stud for securing said deflector to said struts, said clamp arm brackets including an arm, one end of which is secured to said stud, the other end including an encircling portion adapted to be clamped on said rear view mirror bracket arm struts, said bottom rear view mirror struts being inclined and said arm of said clamp arm bracket at the bottom of said panel being twisted so that the encircling portion is also inclined to grip said inclined bottom rear view mirror struts.

15. In combination a truck cab having side windows and a rear view mirror supported from top and bottom bracket arm struts, and a wind deflector mounted on said struts to deflect wind away from the side window and across the reflective face of the rear view mirror, said wind deflector comprising a vertically elongated panel of transparent material, a flange at each vertical end thereof, a threaded stud extending through each bent flange, and a clamp arm bracket mounted on each threaded stud for securing said deflector to said struts, said clamp arm brackets including an arm, one end of which is secured to said stud, the other end including an encircling portion adapted to be clamped on said rear view mirror bracket arm struts, said bottom rear view mirror struts being inclined, and the bottom flange of said panel being also inclined so that the encircling portion of the clamp arm bracket secured thereto is inclined to grip said inclined mirror struts.

16. The combination set forth in claim 11 including a reinforcing plate between said head and flange to protect said flange and to distribute the clamping load thereon.

* * * * *